United States Patent [19]

Knittel

[11] Patent Number: 5,203,499
[45] Date of Patent: Apr. 20, 1993

[54] PROCESS AND APPARATUS FOR CONTROLLING AN INTERIOR SPACE TEMPERATURE OF A MOTOR VEHICLE

[75] Inventor: Otto Knittel, Soest, Fed. Rep. of Germany

[73] Assignee: Hella KG Hueck & Co., Lippstadt, Fed. Rep. of Germany

[21] Appl. No.: 602,141

[22] Filed: Oct. 24, 1990

[30] Foreign Application Priority Data

Oct. 26, 1989 [DE] Fed. Rep. of Germany ....... 3935593

[51] Int. Cl.⁵ .......................................... G05D 23/00
[52] U.S. Cl. .................... 237/2 A; 236/13; 236/76
[58] Field of Search ............... 237/2 A; 236/76, 13; 165/42, 13

[56] References Cited

U.S. PATENT DOCUMENTS 4,485,863 12/1984 Yoshida et al. ................... 236/76 X

FOREIGN PATENT DOCUMENTS 0083048 3/1986 European Pat. Off. .
3222136 12/1982 Fed. Rep. of Germany ..... 237/2 A
053510648 9/1986 Fed. Rep. of Germany .
3611987 10/1987 Fed. Rep. of Germany ..... 237/2 A
3110949 11/1989 Fed. Rep. of Germany ..... 237/2 A
3938057A1 5/1990 Fed. Rep. of Germany .

*Primary Examiner*—Henry A. Bennet
*Attorney, Agent, or Firm*—Griffin Butler Whisenhunt & Kurtossy

[57] ABSTRACT

In a process and apparatus for controlling an interior temperature of a motor vehicle a nominal temperature is set and is used with a sensed interior space temperature to produce a difference value which is fed to a controller (R). The controller produces a controlling value from the difference value which it feeds to an output stage (E) for cyclically and directionally driving a DC motor (M) which adjusts the position of an adjustable member (SG) to influence an amount of heat fed to an interior space (I) of the motor vehicle. A position signal of the adjustable member is measured and fed in a control loop in order to ensure an exact and dependable positioning of the adjustable member, with the positioning signal being formed by measuring and analyzing partial movements of the DC motor through predetermined angles for activations and further rotation of the DC motor.

13 Claims, 3 Drawing Sheets

PROCESS AND APPARATUS FOR CONTROLLING AN INTERIOR SPACE TEMPERATURE OF A MOTOR VEHICLE

BACKGROUND OF THE INVENTION

This invention relates to a process and apparatus for regulating an interior temperature of a motor vehicle.

A process and apparatus for controlling an interior space temperature, particularly for a motor vehicle, of a type of this invention is disclosed in European Patent application 0 083 048. This patent application describes a control apparatus for a heater and/or air conditioner for motor vehicles which has an electrical controller coupled via a first subtractor to a nominal temperature provider and an interior space temperature sensor as well as to an output stage for directionally driving a motor. The motor thereby adjusts the position of an adjustable member which influences the amount of heat channeled to an interior space. In this system, a nominal temperature is set, or fixed, and an interior space temperature is sensed or measured. The first subtractor forms from the nominal temperature and the interior space temperature a first difference value which is fed to the controller. The controller forms from this first difference value a controlling value which it feeds to the output stage and, depending upon the control value, cyclically, or reoccurringly, drives the motor. The motor adjusts the adjustable member to influence the amount of heat fed to the interior space in dependence upon the set nominal temperature and the sensed interior space temperature. Additionally, a position signal of the adjustable member is measured and fed into a control loop in the form of a positioning control loop. The positioning control loop is often, for example as is disclosed in German Offenlegungsschrift DE-OS 35 10 648, of a type in which a potentiometer that is coupled to the adjustable member delivers a voltage value, which depends upon the position of the adjustable member, to the controller or to the control loop in order that the position of the adjustable member is taken into consideration upon controlling the interior space temperature.

A disadvantage of this system is that control of interior space temperature for two different separated space zones is achieved so that a large expense for construction parts is necessary which leads directly to higher costs and which also causes production and mounting thereof to be more expensive.

A particular disadvantage of this prior-art control apparatus and process is that by using a potentiometer to form a position signal, an exact and reliable measurement of the position of the adjustable member is not possible because a potentiometer does not have a necessary precision for measuring and forming a position signal, and circuits for correcting errors arising during measurements with potentiometers are expensive.

In this regard, a particularly disadvantage of producing and mounting an apparatus for controlling interior space temperature, using a potentiometer to establish a position signal, is that it is not cost effective because when mounting the potentiometer and the adjustable member a costly calibration is necessary, with the potentiometer needing a lot of space.

In addition, the prior art apparatus for controlling interior space temperature has proven to be disadvantageous in that it is difficult and expensive to adapt for use in controlling various types of interior spaces.

It is an object of this invention to provide a process and apparatus for controlling an interior space temperature of a motor vehicle which is uncomplicated, has small space requirements, is cost effective, and, by using a DC motor for adjusting an adjustable member, guarantees an exact and reliable positioning of the adjustable member, with the apparatus being mountable and producible in an uncomplicated and cost effective manner, without the use of a costly mount, and which can be adapted for use with various interior spaces.

According to principles of this invention, a position signal is formed by measuring and analyzing partial movements of a dc motor through a predetermined angle for each activation and further rotation of the dc motor.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

Figure 1:
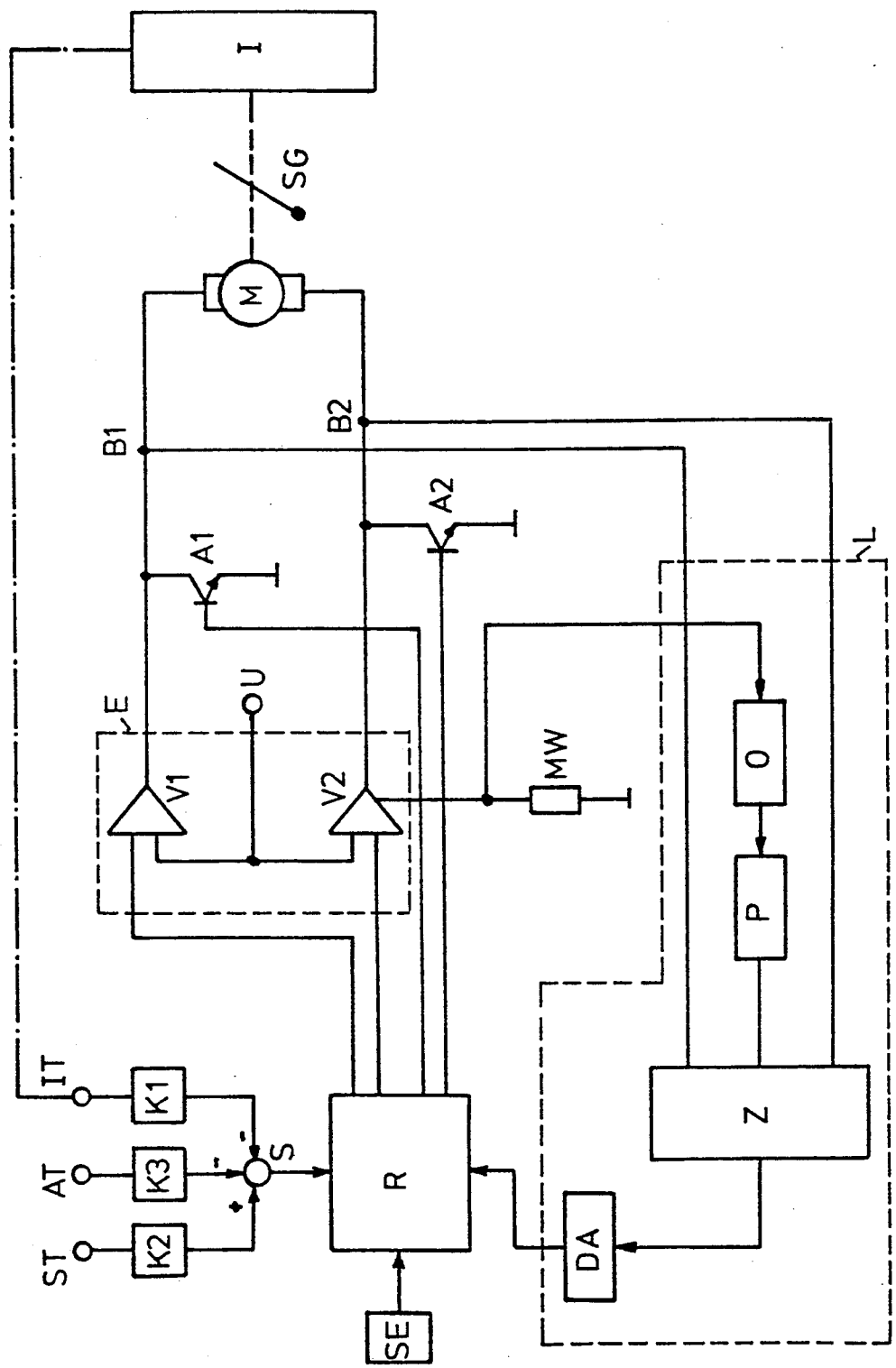
FIG. 1 is a block circuit diagram of an apparatus of this invention.

FIG. 1 shows a block diagram of an apparatus of this invention for controlling interior space temperatures. The apparatus includes a nominal temperature provider ST for setting a nominal temperature. The apparatus includes an interior space temperature sensor IT for measuring the interior space temperature of an interior space I. A dot dash line in FIG. 1 represents that the interior temperature sensor IT measures the interior space temperature of the interior space I. As an example, the apparatus of FIG. 1 includes an exterior temperature sensor AT for measuring exterior temperature. In an uncomplicated embodiment, the exterior temperature sensor AT can be left out. In order to provide an uncomplicated combining of the signals from the nominal temperature provider ST, the exterior temperature sensor AT, and the interior space temperature IT the space temperature provider ST, the exterior temperature sensor AT and the interior space temperature sensor IT are coupled to a common subtractor, or adder, S. As an example, the signal of the nominal temperature provider ST to the subtractor S is shown here with a positive sign, the signal of the exterior temperature sensor AT to the subtractor S is shown with the negative sign and the signal of the interior space temperature sensor IT to the subtractor S is shown with a negative sign. So that the difference signal formed by the subtractor S need not be further processed and can be fed directly to an electrical controller R, the interior space temperature sensor IT is connected to a first adaptor resistor K1, the exterior temperature sensor AT is connected to a third adaptor resistor K3 and the nominal temperature provider ST is connected to a second adaptor resistor K2 so that the signals coming into the subtractor S properly match one another.

The controller R has, for example, two outputs each of which is connected by an electrical lead to an output stage E for driving a dc motor M. The output stage E has here, for example, two comparators V1, V2, each of whose first inputs is coupled with a power voltage terminal U, on which a predetermined constant voltage is provided. The second inputs of the respective comparators V1, V2 are each coupled with a respective output of the controller R. The output of the first comparator V1 is connected with a first terminal B1 of the dc motor M by an electrical lead. The output of the second comparator V2 is connected by an electrical lead with the second terminal B2 of the dc motor M. In this manner, a particularly uncomplicated and cost effective cyclical, pulse or synchronous, directional-dependent, driving of the dc motor M is provided. As used herein, the term cyclical refers to reoccurring signals, including pulse, continuous, and other symetrical and unsymetrical signals as indicated.

The dc motor M is coupled with the adjustable member SG as is represented by a dashed line in FIG. 1, so that the adjustable member is adjustable by the dc motor for channeling heat to the interior space I for guaranteeing that the interior space temperature corresponds to the set nominal temperature. This effect is also represented in FIG. 1 by a dashed line.

The adjustable member SG can be an adjustable air baffle to influence the amount of air channeled to the interior space I and the relationship between warmer and colder air. The adjustable member SG can however also be a water valve that adjusts the flow of hot water to a heat exchanger which is in an air stream to the interior space I.

Additionally, the inventive apparatus has a position control loop which is formed here by a measuring resistor MW and a position signal former L. A current taken from the dc motor M serves here to form a position signal. For measurement of the current taken from the dc motor M, the grounded measuring resistor MW is coupled to the output stage E by an electrical lead as well as to the position signal former L by an electrical lead. The position signal former L is coupled to the controller R.

As an example, the measuring resistor MW is coupled here with the second comparator V2. The measuring resistor MW can however also be electrically coupled with the first comparator V1 or with one of the connections between the output of the first comparator V1 and the first terminal B1 of the dc motor M or the output of the second comparator V2 and the second terminal B2 of the dc motor M. It is only important that the measuring resistor MW be arranged such that a voltage is applied thereto which corresponds to a current taken from the dc motor M and which is fed to the position signal former L over the coupling between the measuring resistor MW and the position signal former L.

The position signal former L has a flank edge recognition device O which includes a differentiating member, or circuit, or a proportional differentiating member which has a predetermined boundary frequency so that the signal is differentiated and a signal is produced by the presence of a predetermined flank edge slope, or steepness, of the motor current, which signal is passed on to a pulse former P. Additionally, the predetermined frequency boundary guarantees suppression of disturbance influences of the signals fed to the flank edge recognition device O. The dc motor M has a predetermined number of armature segments. With a passing of each armature segment, the flank edge recognition device O delivers to the pulse former P a signal so that movement of the dc motor M can be more precisely detected when the dc motor M has more armature segments.

The pulse former P can, for example, be formed as a pulse generator which produces a mono-pulse, that is, a rectangular pulse, in response to receiving a signal from the flank edge recognition device. Each of these rectangular pulses is fed to a counter Z which is coupled with the pulse former P.

The counter Z, which is here, for example, represented by an up/down counter, counts the created pulses for the respective effective rotational directions of the dc motor M with an appropriate sign, with the counter Z being coupled by an electrical lead with the first terminal B1 of the dc motor M as well as by an electrical lead to the second terminal B2 of the dc motor M. Depending upon the driven rotational direction of the dc motor the counter Z receives a signal from the first terminal B1 or the second terminal B2 that switches the counter Z into a counting condition that ensures that the incoming pulses are counted with the correct sign (up or down) in accordance with the position adjustment of the adjustable member SG.

In another embodiment, the apparatus can include two counters Z in which each counter accordingly counts those pulses driving the appropriate first terminal B1 or the second B2 which belong to a corresponding turning direction of the dc motor M. In order to develop a position signal, the signals from the two such counters Z can be fed to a further subtractor.

If the controller R is a digital controller, the signal, that represents the position signal, from the counter Z in the FIG. 1 embodiment, can be fed directly into the controller R. If the controller is constructed as an analog controller, a digital/analog converter DA can be arranged at the connection between the counter Z and the analog controller.

In order to prevent a further, or continued, rotation, or running, of the dc motor M after driving from the output stage E has been turned off, the inventive apparatus includes a first and a second switching device A1, A2. For this purpose, the controller is coupled by an electrical lead with the first switching device A1 over a further output, with the first switching device A1 providing a switching line between the connection of the output of the first comparator V1 and the first terminal B1 to ground when a further output of the controller R puts out an appropriate signal. The controller R is electrically coupled over an additional output with the second switching device A2 whose switching line can couple the connection between the output of the second comparator V2 and the second terminal B2 with ground when an additional output of the controller R has an appropriate signal. In the FIG. 2 embodiment, both of the further outputs of the controller R are coupled to respective bases of first and second transistors A1, A2. There are, however, other switching devices which could be used.

So that the controller R recognizes the activation, or beginning, of regulation, the controller R is electrically coupled by a lead with a start-recognizing device SE. For example, when a power voltage for the controller R is turned on, the start-recognizing device SE furnishes the controller R a signal which allows the controller to carry out predetermined switching and/or controlling operations.

A particularly uncomplicated and cost effective embodiment of the inventive apparatus results when the controller R and/or the start-recognizing device SE and/or counter Z and/or the digital/analog converter DA and/or the pulse former P and/or the flank edge recognition device O and/or the matching resistors K1, K2, K3 are part of a microprocessor which can take over further driving and control functions.

The inventive process for controlling an interior space temperature will be described in more detail with the help of FIG. 1 as follows.

Upon start up of controlling the interior space temperature, that is, when the power voltage is turned on, the controller R is delivered a signal from the start-recognizing device SE which shifts the controller R into a predetermined defined start up condition. A difference value is formed by the subtractor S from a set nominal temperature and a sensed interior space temperature which is fed to the controller R. The controller R forms a control value dependent upon this difference value for driving, or controlling, the end stage E. To improve the control behavior the subtractor S can also be coupled to the exterior temperature sensor so that the exterior temperature is taken into consideration during controlling. The signal from the nominal temperature provider ST is fed here, for example, to the subtractor S with a positive sign while the signals from the exterior temperature sensor AT and the interior space temperature sensor IT are here, for example, fed to the subtractor S with negative signs. In another embodiment, the signals from the nominal temperature provider ST, from the exterior temperature sensor AT and from the interior space temperature IT can be fed to the subtractor S with other signs.

The formed control value from the controller R which, for example, could be a cyclical signal (including a continuous cyclical signal, a pulse signal, reoccurring signal or the like) is fed to the output stage E for driving the dc motor M. The dc motor M is coupled with the adjustable member SG which influences the amount of heat fed to the interior space I.

For turn-direction-dependent driving of the dc motor M, the controller R drives the output stage E either over a first or over a second output. If the controller R is fed a first difference value by the subtractor S, that makes it necessary to shift the adjustable member SG in order to channel warm or cold air to the interior space I, the controller R forms a control value in the form of driving pulses depending upon the necessary rotation direction of the dc motor M, via the first output or the second output of the controller R to the output stage E.

The output stage E develops from the driving pulses from the controller R amplified cyclical signals which drive the dc motor M. The output stage E has here, for example, two comparators V1, V2 whose second inputs respectively are coupled to the controller R and whose first inputs respectively are coupled to the power source voltage terminal U. If the first comparator V1 is driven by the controller R, it forms at its output a reoccurring or cyclical signal which drives the dc motor M via the first terminal B1. During this driving of the dc motor M in a first rotational direction, the second terminal B2 of the dc motor M is coupled to ground at its connection with the second comparator V2. If it is necessary to drive the dc motor M in a second rotational direction, the second comparator V2 of the output stage E is driven by the controller R so that it develops an amplified cyclical, or beat, signal that drives the dc motor via the second terminal B2. In this case, the first terminal B1 of the dc motor M is grounded.

A position control loop is present for sensing, or receiving, a current of the dc motor M which it measures, analyzes, and therefrom feeds a thusly developed position signal to the controller R for exact and certain regulation of heat fed to the interior space I.

Figure 2:
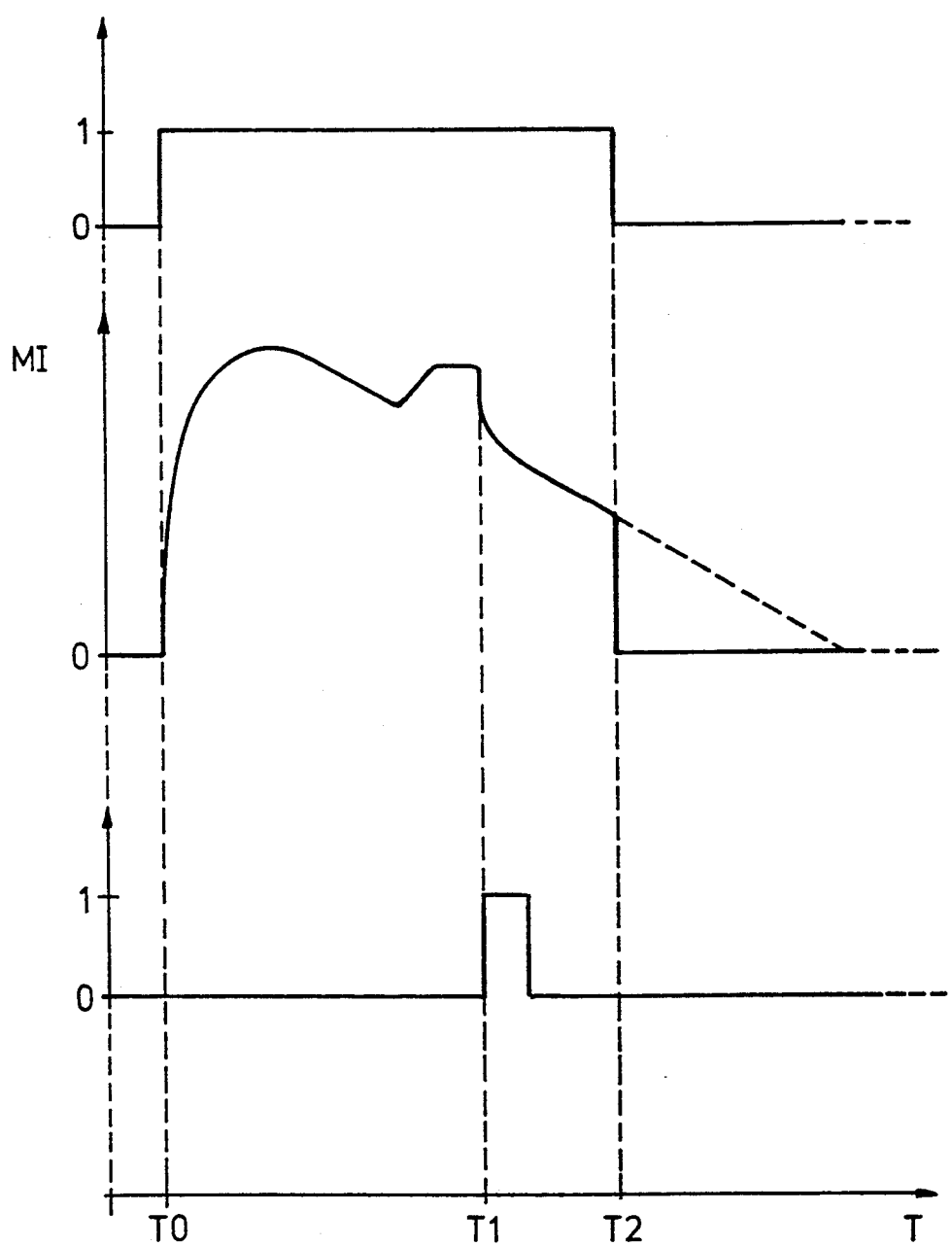
FIG. 2 is a diagrammatic plot depicting operation of an inventive process of this invention.

FIG. 2 shows three diagrams which make clear a partial operation of the process of measuring and analyzing motor current for developing a position. The three diagrams show a common abscissa axis, which is a Time axis.

The top diagram shows an operation over time of a driving pulse for the dc motor M, which causes the dc motor M to be moved one armature segment. For this purpose, a rectangular voltage pulse is formed on one of the outputs of the comparators V1, V2 which, at a point of time T0, rises from a zero voltage value to a voltage value of one and which at a time point T2 is turned off from the value of one to the value of zero.

The middle diagram in FIG. 2 shows a plot of motor current MI for a time period of a driving pulse. Each driving pulse of the top diagram in FIG. 2 moves the dc motor M from a still standing position. Until time T0 the motor current MI is zero. With the appearance of the driving pulse, which places the dc motor M in movement, the motor current MI increases rapidly until it reaches a turning point and, after this rapid increase in current, falls gradually with an almost constantly negative slope. Within this descent of the motor current MI, discontinuities appear which include a gradual climbing of the motor current, a subsequent, short lived, plateau, and, at a time T1 a rapid, steep fall of motor current MI. These steep flank edges after which the motor current again almost constantly decends, can each be used to determine further rotation of the dc motor M through one armature segment. The recognition and analysis of this steep flank edge of the motor current MI at time T1 results because the motor current MI is measured over a measuring resistor MW. The measuring resistor MW which is coupled to ground, is electrically coupled by a lead with the position signal former L and, here, for example, with the second comparator V2 of the output stage E. The measuring resistor MW can thereby, for example, be formed as a small-resistance resistor. In another embodiment example, the measuring resistor MW is also coupled with the first comparator V1 or with the connection between the output of the first comparator V1 and the first terminal B1 of the dc motor M or with the connection between the output of the second comparator V2 and the second terminal B2 of the dc motor M. The measuring resistor MW is in this manner respectively so arranged that the position signal former L is fed a voltage signal which is proportional to the motor current MI taken from the dc motor M.

This signal is fed to a flank edge recognition device O which has a differentiating member, or a proportional differentitting member, to differentiate the measured motor current MI and which by the appearance of a predetermined threshold value for a predetermined flank edge slope of the motor current MI provides an output signal which can be used for forming a position signal.

This output signal, in dependence upon the flank edge of the motor current MI at time T1, is fed to a pulse former P which produces a monopulse, which here, for example, is a rectangular pulse with a predetermined pulse width which ensures that each flank edge, which represents rotation of the dc motor M about one armature segment, can be accurately and dependably analyzed. The bottom diagram in FIG. 2 shows an example of such a pulse which is formed at the time T1 and which has a predetermine pulse width which enables an accurate and dependable counting.

The more armature segments the motor M has, the finer and more accurate movement of the motor M, and thereby adjustment of the adjustable member SG, can be registered and analyzed. Further analysis is accomplished here, for example, by feeding the pulses from the pulse former P to the counter Z.

The counter Z, which here, for example, is an up/-down counter, counts pulses from the first terminal B1 and the second terminal B2 to provide a signal which depends upon the respective turn directions of the dc motor M. The thusly formed count which corresponds to the position signal of the adjustable member SG is fed to the controller R as a digital signal. If the controller R is an analog controller, the digital signal from the counter Z is fed to the controller R through a digital-/analog converter DA.

So that the dc motor M is only moved through one predetermined amount by each drive from the controller R, natural coasting of the dc motor M is suppressed by the first switching device A1, driven by the controller R, coupling the connection between the output stage E and the first terminal B1 to ground and by the second switching device A2 coupling the connection between the output stage E and the second terminal B2 with ground. As can be seen from FIG. 2, at the end of each driving pulse at time point T2, the appropriate connection between the output stage E and the dc motor M which drives the dc motor is grounded via one of the first and second switching devices A1, A2 so that a winding short circuit appears and, as can be seen from the middle diagram in FIG. 2, the dc motor M stands still. From this diagram, it is recognizable that the motor current MI at time point T2 falls to the value of zero and a further running of the dc motor M which is recognizable by the dashed line in the middle diagram, does not occur. Because the counter Z is coupled with the first terminal B1 and with the second terminal B2 of the dc motor M, it is avoided that a flank edge of the motor current MI at time T2 is sensed and forms a pulse which stands for movement of the dc motor M because the counter is turned off for counting. Highly dependable and trust-worthy counting of movement of the dc motor M thereby results.

So that with every initiation of regulation the position of the adjustable member SG can be dependably and trustworthily determined, the controller R at each operation initiation is fed a signal from the start-recognizing device SE whereupon the controller R drives the dc motor M so that the adjustable member SG is shifted to a position which provides a maximum cool amount of heat to the interior space so that in this position of the adjustable member SG the count of the counter Z can be preset to a predetermined count.

When the dc motor is driven to shift the adjustable member SG into the position for providing a maximum cool heat amount, a counting of the pulses will commence and, in order to determine that the predetermined position of the adjustable member SG which guarantees that no warm air reaches the interior space of the motor vehicle is really achieved, the adjustable member SG is driven in a cold direction with several driving pulses. After this procedure, the adjustable member SG is shifted by the dc motor M to a position which the adjustable member SG had during a last period when the control function was out-of-operation. If there is a short break in control operation, the benefit of an increase in comfort results because during a short break in motor vehicle operation only small changes in exterior temperature and interior space temperature are expected so that the interior space will be fed a heat quantity upon renewed operation of the motor vehicle which is only a small bit different from a heat quantity necessary to warm the interior space of the motor vehicle to a desired temperature. It is beneficial for the adjustable member SG to be shifted as fast as possible to the position in which the interior space is fed the maximum cool heat quantity and thereafter to be moved as quickly as possible to the position that the adjustable member assumes during non operation of the motor vehicle because, in this manner, it can be avoided that the interior space will be fed a discomforting amount of cool heat. After the adjustable member SG has been driven to this position, control, in dependence upon the formed difference value, takes place.

Figure 3:
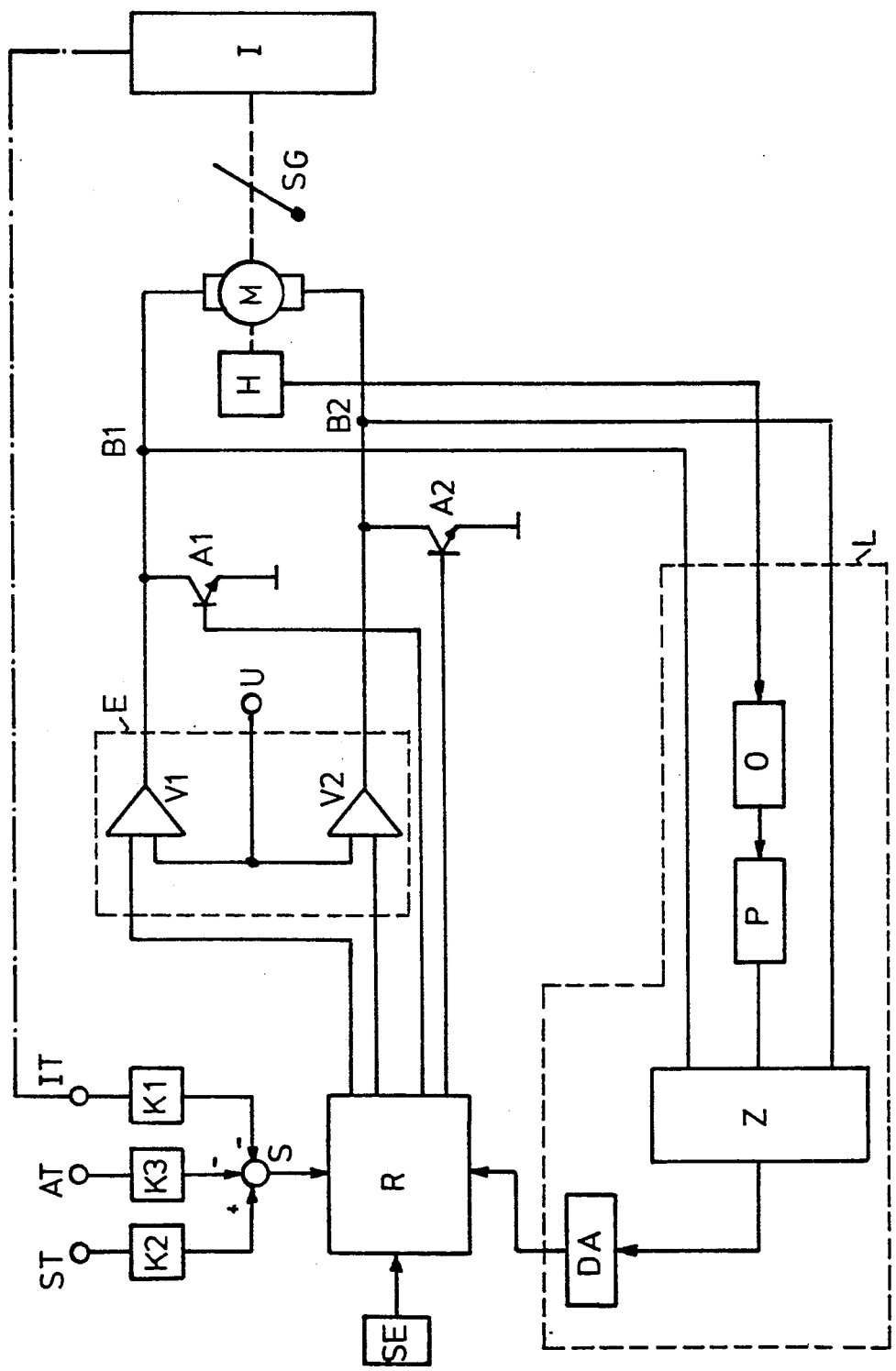
FIG. 3 is a further embodiment of an inventive apparatus of this invention.

FIG. 3 shows a block circuit diagram of a further embodiment of an inventive apparatus.

Similar and similarly-operating parts are provided with identical reference numbers in FIGS. 1 and 3. The FIG. 3 block diagram substantially corresponds to the block diagram of FIG. 1. Compared to the block diagram shown in FIG. 1, the only thing missing in FIG. 3 is the coupling between the output stage E and the position signal former L with the measuring resistor MW for measurement of the effective motor current when the dc motor M is driven.

To form a position signal of the adjustable member SG in the FIG. 3 embodiment, a Hall, or induction, provider H is arranged on the dc motor M and is connected by a lead with the position signal former L. To provide changing Hall voltages which are dependent upon rotational direction of the dc motor M a multipole ring magnet is on the driving shaft of the dc motor M, or on a linkage which shifts the adjustable member SG, adjacent to a Hall provider H. Depending upon the number of poles of the ring magnet, the Hall provider H produces a signal for each partial rotation of the dc motor M that is fed to the position signal former L for analysis and processing. This signal from the Hall provider H can be directly fed to the counter Z if a flank edge slope and a pulse length are sufficient for a certain and dependable count in the counter Z. If this is not the case, a pulse former P can be arranged at the connection between the Hall provider H and the counter Z as is shown in FIG. 3 which, for a predetermined voltage signal from the Hall provider H, respectively produces a monopulse which is suitable for providing a certain and dependable count in the counter Z. If the signal appearing at the pulse former P is not suitable for dependably forming a monopulse, a flank edge recognition device O can be arranged at a connection between the pulse former P and the Hall provider H which has a differentiating member or circuit.

All of the remaining characteristics of the apparatus and process for FIG. 3 are basically the same as those described for FIG. 1.

In a further, not shown, embodiment, corresponding to the FIG. 3 block diagram, the Hall provider H can be replaced by a light detection apparatus. With this inventive apparatus a device for reflecting and/or transmitting light, in dependence upon a predetermined rotational angle of the dc motor M, is positioned on the driving shaft of the dc motor M or on a shaft of a linkage for shifting the adjustable member SG. This device, which, for example, can include a sheet with reflecting or opening areas, includes a light source and a light receiver, with the light receiver being electrically connected with the position signal former L. A signal produced by the light receiver, as in the apparatus of FIG. 3, can be analyzed or further processed.

In the embodiments in which a Hall provider H or a light detection apparatus are used, the first switching device A1 and the second switching device A2 can be eliminated for a particularly uncomplicated and cost effective embodiment of the apparatus.

It is beneficial that the position signal is formed by measurement and analysis of partial movement of the dc motor about a predetermined angle during each activation and further rotation of the dc motor because the position of the adjustable member caused by a predetermined partial movement of the dc motor can be exact and dependable in an uncomplicated and cost effective manner while additionally assuring uncomplicated and cost effective mounting and production.

It is beneficial that the position signal is formed by measuring and analyzing motor current for each activation and each further running of the dc motor because the position of the adjustable member is thereby determined in an uncomplicated and cost effective manner which measures the position of the adjustable member in a particularly exact and certain manner. It is particularly beneficial that a potentiometer can be avoided so that control is accomplished without an expensive mount. Also, without a potentiometer, the apparatus is uncomplicated and cost effective to mount and produced, takes up a small amount of space, is easy to adapt to various interior spaces, and assures a simple, quick, and stable regulation of an interior space temperature of an interior space.

Because for each further rotation of an armature segment of the dc motor a flank edge recognition of motor current is carried out which provides a pulse for each flank showing further rotation of an armature segment—the pulses being counted and fed to the controller—, the benefit of a particularly uncomplicated, cost effective and exact determination of a position signal of the adjustable member results, with an amount of heat being fed to the interior space ensuring that the interior space temperature corresponds to the nominal temperature. Since for each further running, or rotation, of the armature segment of the dc motor a flank edge recognition of the motor current is carried out and since for each flank edge showing further running of an armature segment a pulse is formed, the benefit results that for a dc motor with many armature segments, each partial movement of the dc motor, and thereby each partial shifting of the adjustable member, is measured, analyzed and fed to the control loop for a particularly exact, quick and stable control of the interior space temperature.

It is beneficial that the flank edge recognition results from differentiation of a measured motor current and a threshold-value recognition of a predetermined flank edge slope, or steepness, because in this manner it is made certain that only such flank edges, which represent further rotation of respective armature segments of the dc motor, are fed during times of flowing motor current for counting and developing a position signal, through which a particularly high accuracy of measurement and forming a position signal of the adjustable member results.

By forming a monopulse when a threshold value for a predetermined flank edge slope is exceeded, the benefit arises that counted pulses can be counted and evaluated in an uncomplicated and cost effective manner through which the definite forming of a position signal results in a particularly uncomplicated and cost effective manner.

It is beneficial for a position signal to be produced by measurement and analysis of Hall voltage changes caused by partial movement of the dc motor because this is an uncomplicated and cost effective manner in which an exact, and certain, location of the adjustable member can be guaranteed while requiring inexpensive parts.

In this regard, it is particularly beneficial that the analysis results from a monopulse being formed for each appearance of a predetermined Hall voltage, that the pulses are counted and that a count value is fed to the controller because in this manner, an easy adaptability of the control for various interior spaces is assured.

The same already described benefits result when the position signal comes from measurement and analysis of optical signals which result from predetermined partial movement of the dc motor, the analysis involving forming a monopulse for each appearance of an optical signal, counting the pulses and feeding a count value to the controller.

It is beneficial for counts of the pulses to depend upon rotational direction of the dc motor because in this manner, each rotational direction change of the dc motor is carefully and dependably considered when the position signal is formed so that errors in counting the pulses and forming the position signals are avoided and improper adjustments of the adjustable member do not result.

Because at the end of each driving pulse from the controller to the output stage further running of the motor and pulse counting are suppressed, the benefit arises that movement which the dc motor can carry out is limited, with the dc motor only carrying out those movements necessary for controlling the interior space temperature, and with the count only including pulses which depend upon movement of the dc motor, which, in turn, are predetermined by the control, so that a highly dependable forming of position signals results which leads to a particularly exact and dependable regulation, or control, of interior space temperature.

In this regard, it is particularly beneficial that the suppression of further running of the dc motor results from grounding terminal lines of the dc motor because this provides a particularly uncomplicated and cost effective procedure and structure for dependably preventing further running of the motor.

It is beneficial that the controller, for each activation of the controller, is fed a start signal because in this uncomplicated and cost effective manner a signal can be placed at the disposal of the controller which can be used to place the controller in a predetermined start condition for each activation, thereby preventing errors during and after regulation.

Because for each activation of regulation the adjustable member is shifted to a position for feeding a maximum cool heat amount to the interior space, with the adjustable member then being is subsequently shifted to a position the adjustable member assumes when it is out of operation, the benefit results that for measurement and analysis of the motor current, and for the forming of position signals, the adjustable member is driven to a definite initial, or basic, adjustment in each case, whereby for each activation a standard operation is carried out which makes certain that, for all following regulations of the adjustable member, the position of the adjustable member is definite and dependable.

Additionally, it is also achieved in this manner that the positioning member is assured to be tightly sealed when it is positioned to feed the interior space cool air, as opposed to feeding warm air.

By measuring the exterior temperature and providing a difference value between the nominal temperature, the interior space temperature and the exterior temperature, the benefit arises that, upon regulation of the interior space temperature, the exterior temperature is also taken into consideration so that regulation of the interior space temperature can react quickly and exactly to changes in exterior temperature which leads to regulation without hesitation which is quite exact and provides increased comfort.

The purpose of this invention is carried out by an additional inventive embodiment in that a measuring resistor which is coupled to ground is coupled to the connection between the output stage and the dc motor, or with the output stage and with a position signal former, with the position signal former being electrically coupled to the controller.

It is beneficial that a measuring resistor coupled to ground is coupled to a connection between the output stage and the dc motor, or to the output stage and a position signal former, and that the position signal former is electrically coupled to the controller because in this manner a position control loop is formed in an uncomplicated and cost effective manner which guarantees exact and dependable determination of the position of the adjustable member that, without an expensive mount is cost effectively mountable and producible and can be easily matched to various different interior spaces—for example by changing the resistor—so that an exact, quick, and stable regulation or control of the interior temperature of an interior space results.

The same benefits arise in other inventive embodiments as well.

It is beneficial if the position signal former has a flank edge recognition apparatus and/or a pulse former and/or at least a counter and that the counter is coupled to the controller because with such a solution, in another embodiment, rotation of an armature segment of the dc motor is represented in an uncomplicated and cost effective manner by each flank of a measured motor current, with a further developed pulse for forming a position signal; whereby each movement of the dc motor, and each partial movement of the dc motor, through each armature segment, can be used for forming the position signal.

In the solution according to another embodiment, the flank edge recognition circuit and possibly also the pulse former can be eliminated if a Hall voltage or a voltage developed from an optical signal is sufficient so that the counter can provide a dependable and certain count.

It is beneficial that the flank edge recognition apparatus includes a differentiator or a proportional differentiator that has a predetermined boundary frequency because in this manner, in addition to providing an uncomplicated and cost effective embodiment of the flank edge recognition apparatus, the predetermined frequency boundary accomplishes a suppression of disturbances or noise during measurement of the motor current.

In that the pulse former is a pulse generator or produces a monopulse, the benefit arises that when the flank edge recognition circuit recognizes a flank of the motor current which has a predetermined slope a rectangular signal is formed by the pulse former which allows uncomplicated and dependable further processing.

It is beneficial that the at least one counter is an up-/down counter because a particularly cost effective and uncomplicated embodiment results in which the count of the counter can be fed directly to the controller.

It is beneficial to arrange a digital/analog converter in the connection between the at least one counter and the controller because in this manner also the position signal of the adjustable member which is formed by a count can be fed to an analog operating controller without large part expenditures for parts for controlling interior space temperature.

In that the at least one counter is coupled with a first terminal of the dc motor in a first connection between the output stage and the dc motor and with a second terminal of the dc motor in a second connection between the end stage and the dc motor the benefit arises that an increased certainty and dependability of pulse counting results because the counter, depending upon the signal from the first terminal and the second terminal of the dc motor to the counter which, in turn, depends upon the rotation direction of the dc motor, is switched to counting modes which make certain that the formed pulses for the respective directions of the dc motor are counted by the counter in the correct directions, or with the correct signs.

It is beneficial that the output stage has a first and a second comparator, that the first input of each comparator is coupled to a voltage supply terminal, that the second input of each comparator is connected with the controller, that the output of the first comparator is electrically connected with the first terminal of the dc motor and that the output of the second comparator is electrically connected with the second terminal of the dc motor because in this manner a particularly uncomplicated and cost effective reoccurring or cyclical (including beat, pulse, and the like), rotation-direction-dependent, driving of the dc motor takes place which works with dependability and certainty.

In that the controller is electrically connected with a first switching device which can couple the connection between the output of the first comparator and the first motor terminal with ground as well as is electrically coupled to a second switching device which can couple the connection between the output of the second comparator and the second motor terminal with ground, the benefit is provided that, in an uncomplicated and cost effective manner, coasting, or further running, of the dc motor can be avoided so that, depending on the driven rotation direction of the dc motor, the first and/or the second switching device couples the first and/or second terminal of the dc motor with ground at, for example, the respective end of a driving pulse from the controller so that the dc motor is brought to a standstill and the adjustable member is not placed in an improper position, with an exact position signal being formed.

It is beneficial that the first switching device and the second switching device are transistors because a particularly uncomplicated and cost effective construction of the apparatus results therefrom.

It is beneficial that the controller is coupled to a start-recognizing device because in a uncomplicated and cost effective manner the controller can be fed a signal for each new regulation activation for placing the regulation process in a definite beginning position, in which, for example, the adjustable member can be shifted to a predetermined defined position which allows the standardization, or calibration, of a position control loop whereby a certainty, during operation of the apparatus, and dependability and accuracy of control are increased.

It is particularly beneficial that the subtractor is additionally coupled to an exterior temperature sensor because with only a small additional expenditure a substantial increase in control, and therefore in comfort, can be accomplished by taking into consideration exterior temperatures.

In that a respective resistor is arranged in each connection between the nominal value provider and the subtractor and/or the interior space temperature sensor and the subtractor and/or the exterior temperature sensor and the subtractor, the benefit is provided that signals arising at the subtractor match one another in an uncomplicated and cost effective manner so that the subtractor can form a difference value which can be fed to the controller for forming a controlling value without further influences.

It is beneficial that the controller and/or the start-recognizing device and/or the counter and/or the pulse former and/or the flank edge recognition device and/or the matching resistors and/or the digital/analog converter are part of a microprocessor, because a particularly uncomplicated and cost effective embodiment of the apparatus thereby results.

While the invention has been particularly shown and described with reference to preferred embodiments, it will be understood by those skilled in the art that various changes in form and detail may be made therein without departing from the spirit and scope of the invention.

The embodiments of the invention in which an exclusive property or privilege are claimed or defined are as follows:

1. In a process for controlling interior-space temperature of a motor vehicle of a type in which a nominal temperature is preset and an interior space temperature is measured from which a difference value is formed and fed to a controller from which a regulation value is formed and fed to an output stage for cyclically and directionally driving a dc motor which adjusts the position of an adjustable member to influence an amount of heat fed to an interior space of the motor vehicle, with a position-signal of the adjustable member being measured and fed into a control loop, the improvement wherein:
   the position signal is formed by measurement and analysis of partial movements of the dc motor through predetermined angles for activation and further rotation of the dc motor;
   wherein said measurement and analysis of partial movements is accomplished by measurement and analysis of a motor current for each activation and each further rotation of the dc motor.

2. Process according to claim 1 wherein the analysis results from a flank recognition of a flank edge of a motor current during each further rotation of an armature segment of the dc motor, with a flank pulse being developed for each further rotation of an armature segment, the pulses being counted and the count being fed back to the controller.

3. Process according to claim 2 wherein the flank-edge recognition is accomplished by differentiating the measured motor current and recognizing a predetermined threshold value of a flank slope or steepness.

4. Process according to claim 3 wherein a mono-pulse is formed for a flank slope which exceeds a predetermined threshold value.

5. Process according to claim 1 wherein the exterior temperature is measured and the first difference value is formed from the nominal temperature, the interior space temperature and the exterior temperature.

6. In a process for controlling interior-space temperature of a motor vehicle of a type in which a nominal temperature is preset and an interior space temperature is measured from which a difference value is formed and fed to a controller from which a regulation value is formed and fed to an output stage for cyclically and directionally driving a dc motor which adjusts the position of an adjustable member to influence an amount of heat fed to an interior space of the motor vehicle, with a position-signal of the adjustable member being measured and fed into a control loop, the improvement wherein:
   the position signal is formed by measurement and analysis of partial movements of the dc motor through predetermined angles for activation and further rotation of the dc motor;
   wherein the position signal is developed from measurement and analysis of Hall voltage changes created from partial movements of the dc motor.

7. In a process as in claim 6 wherein the analysis results from creation of a mono-pulse for each appearance of a predetermined Hall voltage, with the pulses being counted and a count value being fed to the controller.

8. In a process for controlling interior-space temperature of a motor vehicle of a type in which a nominal temperature is preset and an interior space temperature is measured from which a difference value is formed and fed to a controller from which a regulation value is formed and fed to an output stage for cyclically and directionally driving a dc motor which adjusts the position of an adjustable member to influence an amount of heat fed to an interior space of the motor vehicle, with a position-signal of the adjustable member being measured and fed into a control loop, the improvement wherein:
   the position signal is formed by measurement and analysis of partial movements of the dc motor through predetermined angles for activation and further rotation of the dc motor;
   wherein said measurement and analysis of partial movements results from measurement and analysis of optical signals which are produced by partial movements of the dc motor.

9. In a process as in claim 8 wherein the analysis results from producing a mono-pulse for each appearance of an optical signal, with the pulses being counted and a count value being fed to the controller.

10. In a process for controlling interior-space temperature of a motor vehicle of a type in which a nominal temperature is preset and an interior space temperature is measured from which a difference value is formed and fed to a controller from which a regulation value is formed and fed to an output stage for cyclically and directionally driving a dc motor which adjusts the position of an adjustable member to influence an amount of heat fed to an interior space of the motor vehicle, with a position-signal of the adjustable member being measured and fed into a control loop, the improvement wherein:

the position signal is formed by measurement and analysis of partial movements of the dc motor through predetermined angles for activation and further rotation of the dc motor;

wherein the controller provides pulses to the output stage for driving the dc motor and wherein further running of the dc motor and further analysis of partial movements of the dc motor are suppressed at the end of each pulse.

11. In a process as in claim 10 wherein suppression of further running of the dc motor is accomplished by grounding terminals to the motor.

12. In a process as in claim 11 wherein a start signal is fed to the controller each time the controlling process is commenced.

13. In a process as in claim 12 wherein each time the controlling process is commenced the adjustable member is moved to a position for feeding an amount of heat to the interior space for producing maximum coolness therein and wherein the adjustable member is subsequently moved to a position which it had when it was out of operation.

* * * * *